2,265,386

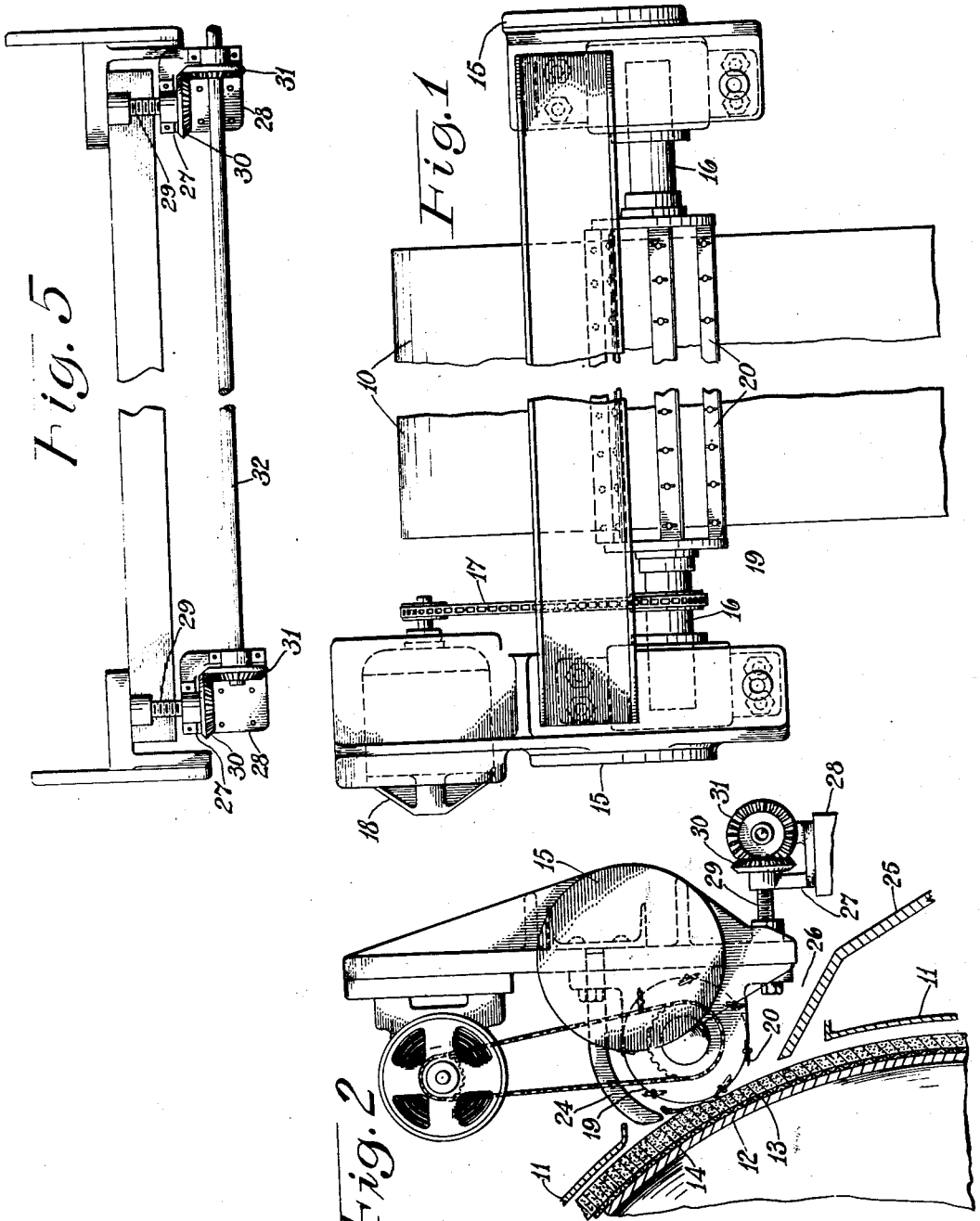
Dec. 9, 1941.  F. H. McBERTY ET AL  2,265,386
APPARATUS FOR FILTERING
Filed May 26, 1939  2 Sheets-Sheet 1
Ford H. McBerty
Clarence H. Evans
Roger O. Waugh
INVENTORS
BY John P. Hancock
ATTORNEY Dec. 9, 1941.  F. H. McBERTY ET AL  2,265,386
APPARATUS FOR FILTERING
Filed May 26, 1939   2 Sheets-Sheet 2
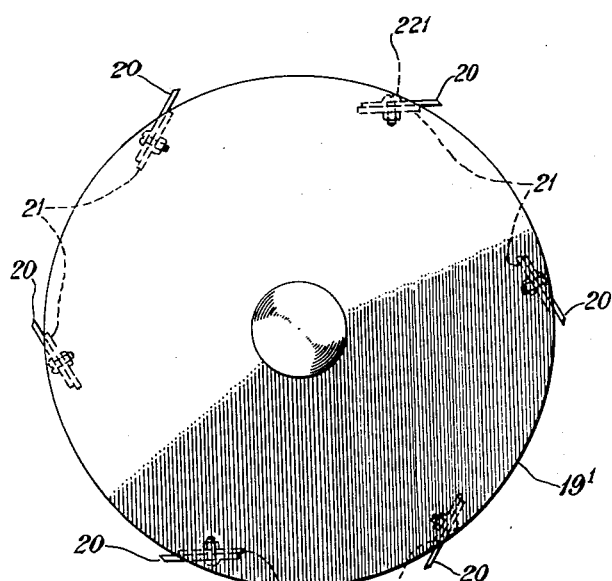
Fig. 3
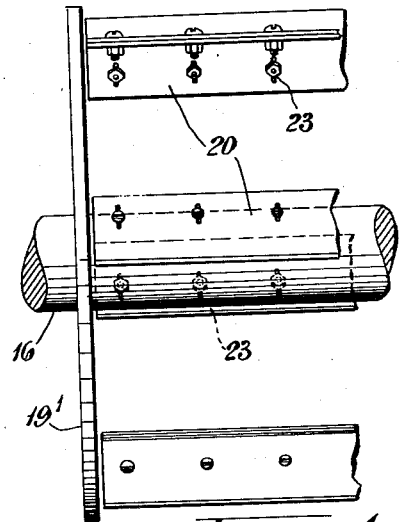
Fig. 4
Fig. 8
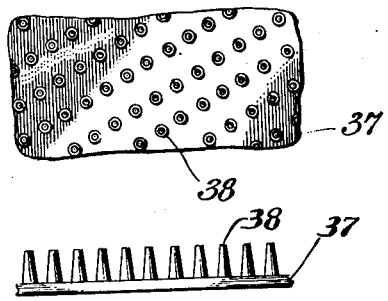
Fig. 6
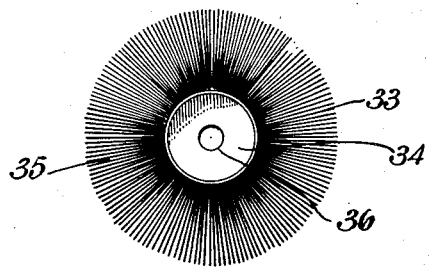
Fig. 7
Ford H. McBerty
Clarence H. Evans
Roger O. Waugh
INVENTORS
BY John P. Hancock
ATTORNEY Patented Dec. 9, 1941

UNITED STATES PATENT OFFICE 2,265,386

APPARATUS FOR FILTERING

Ford H. McBerty, Newark, and Clarence H. Evans, Wilmington, Del., and Roger O. Waugh, Drexel Hill, Pa., assignors to E. I. du Pont de Nemours & Company, Wilmington, Del., a corporation of Delaware Application May 26, 1939, Serial No. 275,856

7 Claims. (Cl. 210—201)

This invention relates to a process and apparatus for separating suspended solids from fluids and more particularly to an improved method and means for removing solids from liquids by filtration.

More specifically, the invention pertains to improvements in rotary separators or filter devices of the vacuum or pressure type which employ adsorbent filtering media, and to novel means for maintaining the filter surfaces thereof in thoroughly clean and uncontaminated state at all times, whereby the efficiency and capacity of such separator or filter devices become materially and desirably increased.

In the clarification of liquids of a slimy or colloidal nature, it is customary to employ a previously prepared porous filtering medium, such as fuller's earth or other adsorbent infusorial or diatomaceous earth material, such filtering agent being usually mounted upon a rotary drum through which the liquor to be clarified passes. As a result, the filtering material retains the suspended solids present in the liquor and permits passage of the clarified solution to a source of collection. Various methods and means for maintaining the surface of the filtering medium in unclogged condition and free of slimy material have been proposed, one particular form of device therefor comprising that described in U. S. Patent 2,083,887. While useful to some degree, said device often affords difficult and unsatisfactory operations, especially when employed for effecting removal of solids from titanium solutions or otherwise clarifying liquors produced in titanium oxide pigment producing operations. This is chiefly occasioned by the fact that the solids and colloidal slimes sought to be removed are of such pasty, sticky character that they tend to build up or accumulate on the cutter, knife or scraper elements employed to remove a portion of the filtering material on a revolution of the drum, thereby necessitating frequent manual cleaning. Frequently also, these accumulating solids cause a smearing action of the precoat filter surface to induce so-called "blinding." As a consequence, not only is the filtration rate greatly reduced and impaired, but oftentimes completely interrupted. Frequent and prolonged shutdowns for cleaning are therefore necessitated. Even when these special precautions are resorted to, desired maximum filtration capacity of the equipment cannot be attained because the scraper element itself tends to smear the filtering surface when scraping off the solids.

We have found that these disadvantages in prior separating or filtering devices can be effectively overcome, and it is accordingly among the objects of our invention to provide an improved device for affording such result. Other specific objects and advantages include the provision of an improved type of separator which, though particularly adapted for use in the clarification of titanium liquors, is also advantageously employable in the clarification of other types of liquors in which solids are colloidally or otherwise suspended; to provide a separator device which is relatively simple and compact in construction, positive in its action, and one which insures at all times a continuous type of operation and effective and complete removal of solid materials from the liquor under treatment. A special object of the invention is to provide an improved type of filtering apparatus in which the surface of the filtering media presented to the liquor under clarification is constantly fresh and in free and uncongested condition, whereby the efficiency of such filtering media always remains substantially unimpaired. Further particular objects are to provide an improved method of removing the separated solids with a minimum quantity of the precoat material, consistent with the proper exposure of fresh filtering surfaces required for continuous, uniform filtration; to provide an effective means of transferring the solids from the point of removal to a point of discharge, whereby such removed solids will not interfere with subsequent solids removal; to provide a self-cleaning device for removing such solids whereby minimum attention for proper operation of the filter will be required.

These and other objects will be apparent from the ensuing description of our invention, as well as from the accompanying illustrative drawings comprising one preferred and useful embodiment of an apparatus adapted for use in the invention, and wherein Fig. 1 represents a plan view of one preferred type of apparatus embodying our invention;

Fig. 2 comprises a segmental, side elevation view, partly in section, showing more in detail the drum and scraper assembly of Fig. 1;

Figs. 3 and 4 comprise detailed sectional views of the scraper means employed in Figs. 1 and 2;

Fig. 5 comprises an enlarged detail of the slide arrangement shown in Fig. 2; while Figs. 6, 7 and 8 (Fig. 8 being a plan view of Fig. 6) comprise modified forms of scraper elements utilizable in the invention.

Referring to the accompanying drawings (which are not to scale and in which like numerals designate like parts throughout), and particularly to Figs. 1 and 2, there is shown a cylindrical or drum type rotary separator apparatus 10 comprising substantially the same general character of separator as that described in said United States Patent 2,083,887, and upon which the present invention constitutes an improvement. Said separator comprises, in combination, a semi-cylindrical tank or basin element 11 supported within a suitable frame and upon conventional base members, neither being shown, and a drum 12 suitably positioned within said tank and journalled for rotation in said tank and frame. The cylindrical surface 13 of the drum consists of a suitable supporting material, such as wire screen, wire cloth, perforated sheet metal, etc., to which an adsorbent or infusorial earth precoat or multicoat filtering medium 14 may be applied and through which liquor to be clarified may pass while the entrained solids content of said liquor becomes retained upon the surfaces of said filter. Preparation of the precoat or multifold filter and application of the same to the body of the drum may be effected in any conventional manner, as for instance in accordance with the procedures outlined in said patent. Likewise, operation of the separator 10 may be effected in any desired manner. The procedures and mechanism described for the purpose in said patent, and especially for effecting operation of the drum 11, will be found usefully adaptable.

In filtering a solution to be clarified in the rotary separator, said solution is introduced in any convenient manner into the tank associated with the rotatable drum 11. Upon maintenance of a partial vacuum within said drum, a suction is set up to draw liquid through the surfaces of said filtering medium 13 surrounding the surfaces of the cylindrical drum, and deposit entrained colloidal solids and slimes on such filter surfaces. As clarification continues, the extent of these deposited materials increases, to clog the pores of the filtering agent, greatly impair its efficiency and oftentimes stopping filtration completely.

In said Patent 2,083,887 it is proposed to effect removal of solids collecting on the surfaces of said filtering media by use of scraper elements consisting of a stationary "doctor" or helical knife mounted on a slide arrangement guided on a bracket adapted to be moved towards or away from the cylindrical drum. However, these elements have proved unsatisfactory for the intended purpose, as already stated, especially in instances of titanium liquor clarification, whereby in solutions of a highly colloidal, slimy and sticky nature are encountered.

In accordance with our invention, we propose to overcome the difficulties and discontinuous separator operation encountered in previous attempts at removal of solids and colloidal slimes from the surfaces of filtering media. For the purpose, we provide, in combination with said separator apparatus, and cooperatively arranged with respect to the drum element, rotary types of scraper elements capable of operating at relatively high and controlled rates of speed, which elements are substantially self-cleaning in character, and which at all times maintain the surfaces of said filtering media in relatively clean and fresh condition, thereby enabling said apparatus to operate in a substantially continuous, uninterrupted manner.

In description, a preferred adaptation of the invention involving the use of rotary scraper knives or blades will be exemplified. In said adaptation we dispose in cooperative relationship with the drum 12 a cross frame or support member 15 and journal for free rotation in said frame a shaft 16. A sprocket or other type of wheel (not shown) may be keyed or otherwise secured to the shaft 16, a sprocket chain or belt member 17, communicating with a source of power such as a motor 18, being also provided which functions to impart controlled, independent rotary motion to said shaft. Also keyed to one end of the shaft 16 so as to be rotatable therewith is a cutter element 19 of the rotary type, made up, preferably, of a plurality of disc members 19' to which may be adjustably secured, as shown, a plurality of knife-like cutter blades 20. Said blades are releasably secured to said discs by means of the adjustable support members 21, the cross members 22 and the bolt or set screw fastening means 22'. Through the medium of the supports 21, variance in and maintenance of the angle or pitch of the blade members at any desired degree may be conveniently had. As shown, the blade members 20 are provided with suitable apertures or slot members 23 which permit the same to be adjusted and maintained at the desired and correct projected distance beyond the periphery of the discs 19', thereby eliminating any necessity of frequent blade replacement in the event any wearing of said blades should occur. Spacedly disposed above the rotary cutter 19 and suitably secured to the support 15 is a substantially semi-cylindrical guard element 24 functioning to direct solids and slimes thrown from said rotary element 19 to a point of removal. In order to avoid retention of such slimes or solids on the guard element, a vibratory motion may be imparted to the same by mounting a vibrating element (not shown) thereon. Spacedly disposed below the rotary element 19 and adapted to receive materials discharged from said cutter and guard element 24 is a suitable deflector element 25 communicating with a discharge outlet 26 through which separated solids and slimes pass from the separator to a conventional conveying mechanism such as one of the belt or screw conveyer type.

The supporting frame 15 and cutter element 19 are mounted upon a suitable slide arrangement 27 adapted to be guided, by means of a bracket element 28, for radial movement towards and away from the drum 12. Movement of the slide 27 may be conveniently effected through means of a screw element 29 connected to beveled gears 30 and 31 adapted to be operated by means of a cross shaft 32 which may be rotated through direct connection with the drum 12 by means of a belt or sprocket chain (not shown) or by manual means, as by a crank (also not shown).

In a practical adaptation, upon initial adjustment of the rotary cleaning element 19 so that its peripheral extremities become disposed in substantially contiguous, touching relationship with the external surfaces of the filter 14 making up the periphery of the drum 12, the shaft 16 is suitably powered. Rotation of said shaft imparts like rotary movement to said element 19, said element being thereby caused to move, preferably, at a relatively constant, high rate of speed, in such direction that that portion of the rotary element 19 which directly engages the surface of the filtering medium travels in the same direction as the drum 12.

As a result of said adjustment and rotation, the cutters 20 on the rotor 19 remove the solids and slimes which collect on the drum surfaces and also remove a relatively slight or thin layer of the filtering agent itself, to continuously present a clean filter surface for succeeding clarification operations. As indicated, the amount of filtering agent removed on each revolution of the drum is relatively slight, and does not exceed preferably substantially one seventy-fifth of an inch, and is usually from about one one-hundredth to one one-hundred-twenty-fifth of an inch.

In conjunction with the cleaning action thus afforded, such rotor speeds are preferably maintained as will positively insure development of centrifugal action to such extent and magnitude that removed solids, colloidal slimes and filter media are quickly and violently thrown from the rotor onto the associated guard arrangement 24, being thence passed from the apparatus by means of deflector 25 and outlet 26 for disposal. In any given instance the rotor speeds necessary for this purpose and for promoting and insuring a self-cleaning action on the part of the rotary cutting or cleaning element of said rotor, will be governed by the centrifugal forces required to throw off such removed solids and slimes as well as the smoothness of the filtering surface after such removal; and will therefore depend upon the size, type, or character of the rotary element which is being employed, the nature or sticky character of the solids and slimes to be removed, and the extent of self-cleaning action which is desired. We have found that, particularly in instances of titanium liquor clarification, and when using a 12" diameter rotary cutter such as of the type described, a speed of at least 700 R. P. M. must be resorted to, a useful, preferred range being from about 1,000 to 2,000 R. P. M. or 3,000 R. P. M. In the procurance of optimum results in the invention we preferably resort to a rotary cutter speed of about 1,500 R. P. M..

While one preferred embodiment of the invention has been illustratively described which involves the use of a rotor 19 comprising a series of disc elements 19' to which, as shown, six cutting blades or knife elements 20 are angularly secured, it will be evident that the invention is not limited thereto. Thus, if desired, the number of blades mounted on said rotor may be varied and in accordance with the rotor speeds which are to be resorted to. For instance, in lieu of six blades and utilization of a rotor speed of say 1,500 R. P. M., three or nine blades may be used and in conjunction with rotor speeds of, say, 3,000 or 1,000 R. P. M., respectively. Also, though the blades are shown mounted to form an angle of 40° with a tangent to said discs at this point, such angle is not critical and may be varied, as desired. Advantageously, the cutting edges 20' of said blades are suitably bevelled, preferably approximately parallel to said tangent. As a consequence, wear of the blades occurs along the same plane rendering unnecessary frequent blade resharpening.

Similarly, in lieu of employing a rotor 19 of the blade or cutter type, we may use rotors of the brush or sweep type and such as illustrated in the modifications shown in Figures 6, 7 and 8. In these figures a rotary brush 33 is shown suitably provided with a cylindrical metallic or wooden support member 34 to which a plurality of substantially radially extending brushing or cleaning means 35 may be suitably secured. A shaft 36 is provided in the support 37 whereby such cleaning element may be mounted for rotation in the frame 15 and in a manner substantially similar to that contemplated for said rotor 19. The cleaning means 35 consists preferably of a bristle-like material which, while relatively resilient, is not too flexible in character. Thus said means may comprise fibrous, laminated, or metallic wire-like substances adapted for corrosion and abrasion resistance; or the same may consist of rubber-like material such as the bristled rubber substance 37 provided with bristle elements 38. As in the instance of blade types of rotors, said brushing elements need not be confined to metals and alloys for corrosion and abrasion resistance, but may be made up of various types of materials such as hard rubber, glass, plastics, etc. The choice of the type of brush or cutter element to be employed will be guided by the nature of the material to be removed from the precoat filter, for instance when removing separated solids of an abrasive nature it will be found advisable to employ a brush element made of metal alloy wires possessing good abrasive resistance. In the event the solution from which the solids are separated is of corrosive character and deleteriously affects ordinary organic fibers or metals such as steel, the use of wires or bristles made of an alloy resistant to such corrosion or made up of rubber matting will be found to be preferable types for use.

As indicated the preferred direction of rotation of the rotary element is the same as the filter drum and accordingly said rotor is suitably mounted on the down or discharge side of the filter for uniform and controlled movement toward and away from said drum. In such instance a relatively smoother performance and removal of solids is effected in the apparatus but it will be found that satisfactory operations can obtain when reversed rotation is resorted to.

Economy of operation of precoat filters is, amongst other things, dependent upon the consumption of the precoat material. Our invention enables a very substantial reduction in the consumption of such materials. This is accomplished by the fact that we may effect the taking of a thinner cut by use of our devices, without reducing the capacity or otherwise adversely affecting the operation of the filter, than has been heretofore possible with the prior types of scrapers. For example, a stationary scraper had to be advanced toward a precoat filter drum, filtering residual solids from an acid solution, at a rate of .0020" per drum revolution to maintain the required filtration rate. In our rotary brush and cutter type of mechanism an advancement of .0012" per drum revolution need only be had to maintain equal filtering capacity on the same filter with the same material. Thus we enable a saving of 40% of the precoat material.

The attention required for the proper operation of precoat filters depends to a large extent on the ease of transferring the removed solids from the point of removal to a discharge point. In the case of prior scrapers, particularly when sticky or pasty solids are being removed, such solids tend to adhere and build up on the scrapers to materially interfere with their function and proper subsequent removal of new solids. Frequently these built-up solids cause a smearing action of the precoat filter surface inducing "blinding" to occur. As a consequence, the filtration rate is greatly reduced or even completely interrupted. Frequent manual cleaning of the scraper blades must be resorted to. Even with such special precautions, maximum filtration capacity of the equipment cannot be had, the scraper itself tending to smear when scraping off the solids. By means of our invention these difficulties are completely eliminated. The solids are removed by sweeping of successive thin layers, in the case of the rotary brush, and by cutting off successive thin layers, in the case of the rotary cutter. In each case the motion at the point of contact is away from the remaining solids so that the tendency to smear is practically eliminated. Furthermore, the removed solids are conveyed at once from the immediate vicinity of the removal operation, and due to the centrifugal force set up, are thrown off the brush or cutter, to present clean sweeping or cutting surfaces at all times for subsequent solids removal. In this manner no attention is required to assure desired filtration capacity and proper operation.

It will be obvious from the foregoing description that the process and apparatus described has general application wherever solids and fluids are to be subjected to separation and that suitable modification thereof may be had without departing from the underlying scope and concept of our invention. While the rotary separator shown and described in detail comprises one of the cylindrical or drum type, the invention may be applied to other forms, such as cone, disc or endless conveyor or band types.

We claim as our invention:

1. A separator comprising in combination a drum, porous filter media mounted on said drum, a rotary cleaning element disposed in cooperative relationship with respect to said filter media and drum and adapted, upon movement, to remove a portion of said filter media, together with filtered solids and slimes which accumulate thereon, and driving means for rotating said cleaning element at a rate of speed of at least 700 R. P. M. to effect the substantially immediate, centrifugal discharge from said element of material so removed from said filter media.

2. A separator comprising in combination a drum, a porous filtering agent mounted on said drum, a non-helical, rotary shearing element disposed in cooperative relationship with respect to said filtering agent and drum and adapted, upon movement, to remove a portion of said filtering agent, together with the filtered solids and slimes collecting thereon, and independent driving means for rotating said shearing element at a rate of speed of at least 700 R. P. M. to effect the substantially immediate, centrifugal discharge therefrom of materials so removed from said filtering agent.

3. A separator comprising in combination a drum, a porous, distintegrable filtering agent mounted on said drum, a non-helical rotary cleaning element provided with a plurality of shearing blades disposed in cooperative relationship with respect to said filtering agent and drum and adapted, upon movement, to remove a portion of said agent, together with filtered solids and slimes collecting thereon, and independent driving means for said cleaning element adapted to rotate said element at a rate of speed of at least 700 R. P. M., whereby the substantially immediate, centrifugal discharge from said cleaning element of material removed from said filtering agent becomes effected.

4. A separator comprising in combination a drum, a porous, distintegrable filtering agent disposed on the surfaces of said drum, a non-helical rotary cleaning element provided with a plurality of adjustable shearing blades, disposed in cooperative relationship with respect to said filtering agent and drum and adapted, upon movement, to remove a portion of said agent, together with filtered solids and slimes collecting thereon, and independent driving means for imparting high speed rotary movement to said cleaning element at a rate of speed ranging from about 700 to 3000 R. P. M., whereby materials so removed from said filtering agent become discharged substantially immediately by centrifugal action to render said cleaning element substantially self-cleaning.

5. A separator comprising in combination a drum, a porous, disintegrable filtering agent carried by said drum and forming a peripheral surface thereof, a non-helical rotary cleaning element provided with a plurality of adjustable shearing or cutting blades disposed in cooperative relationship to the external surfaces of said disintegrable filtering agent and adapted, upon movement, to remove a portion of said agent, together with filtered solids and slimes which accumulate thereon, and independent driving means for rotating said cleaning element at a relatively constant, high rate of speed of at least 700 R. P. M., to render the same substantially self-cleaning in action through the substantially immediate, centrifugal discharge from said element of materials so removed from said filtering agent.

6. A separator comprising in combination a cylindrical drum, a porous, disintegrable filtering agent mounted on said drum, a rotary brushing element cooperatively disposed with respect to said filtering agent and adapted, upon movement, to remove a portion of said agent, together with filtered solids and slimes which accumulate thereon, and independently controlled driving means for imparting rotary movement to said brushing element at a rate of speed of at least 700 R. P. M. and sufficient to effect the substantially immediate, centrifugal discharge from said element of material so removed from said filtering agent.

7. A process for removing accumulated solids and slimes collecting on the surfaces of a porous filtering agent employed in liquor clarification operations, which comprises subjecting the filtering surfaces of said agent to the action of a high speed rotary cleaning element cooperatively disposed with respect to said agent and adapted to remove a small portion of the latter, together with said accumulated materials, and concurrent with such removal maintaining a peripheral rate of speed for said cleaning element of at least 700 R. P. M. to effect the substantially immediate, centrifugal discharge from said element of materials so removed from said porous filtering agent.

FORD H. McBERTY.
CLARENCE H. EVANS.
ROGER O. WAUGH.